United States Patent
Umehara et al.

(10) Patent No.: US 11,929,481 B2
(45) Date of Patent: Mar. 12, 2024

(54) METHOD FOR MANUFACTURING RECHARGEABLE BATTERY

(71) Applicants: PRIMEARTH EV ENERGY CO., LTD., Kosai (JP); TOYOTA JIDOSHA KABUSHIKI KAISHA, Toyota (JP); PRIME PLANET ENERGY & SOLUTIONS, INC., Tokyo (JP)

(72) Inventors: Masakazu Umehara, Toyota (JP); Naomichi Ishikawa, Kosai (JP); Naoto Ooshiro, Hamamatsu (JP); Yuuki Kudou, Sendai (JP); Hideki Hayashi, Kurokawa-gun (JP); Hiroki Yamada, Sendai (JP); Naoya Kishimoto, Nagoya (JP)

(73) Assignees: PRIMEARTH EV ENERGY CO., LTD., Kosai (JP); TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 18/072,560

(22) Filed: Nov. 30, 2022

(65) Prior Publication Data
US 2023/0178708 A1    Jun. 8, 2023

(30) Foreign Application Priority Data

Dec. 3, 2021   (JP) ................. 2021-196692

(51) Int. Cl.
*H01M 4/04* (2006.01)
*H01M 4/02* (2006.01)
(Continued)

(52) U.S. Cl.
CPC ......... *H01M 4/0435* (2013.01); *H01M 4/134* (2013.01); *H01M 4/366* (2013.01);
(Continued)

(58) Field of Classification Search
CPC ........................ H01M 4/0435; H01M 4/463
See application file for complete search history.

(56) References Cited

U.S. PATENT DOCUMENTS 11,094,920 B2 *  8/2021  Hirukawa ............ H01M 4/139
2017/0125790 A1  5/2017  Fukunaga et al.
(Continued)

FOREIGN PATENT DOCUMENTS

JP      2003100286 A    4/2003
JP      2017084697 A    5/2017
(Continued)

OTHER PUBLICATIONS

Japan Office Action dated Oct. 24, 2023 in application No. 2021-196692.

*Primary Examiner* — Seyed Masoud Malekzadeh
*Assistant Examiner* — Timothy G Hemingway
(74) *Attorney, Agent, or Firm* — Maschoff Brennan

(57) ABSTRACT

A method for manufacturing a rechargeable battery includes forming a mixture layer and an insulating layer on an electrode substrate having an edge extending in a specified direction so that an exposed portion where the electrode substrate is exposed extends between the edge and the insulating layer; pressing the mixture layer; and stretching an extension portion, located between the edge and the mixture layer, and the insulating layer in the specified direction. The stretching includes applying a stress greater than or equal to yield stress of the electrode substrate or greater than or equal to 0.2% proof stress of the electrode substrate and less than tensile strength of the electrode substrate to the extension portion, and applying a stress greater than or equal to yield stress of the insulating layer or greater than or equal to 0.2% proof stress of the insulating layer to the insulating layer.

5 Claims, 6 Drawing Sheets

(51) Int. Cl.
   *H01M 4/134*   (2010.01)
   *H01M 4/36*   (2006.01)
   *H01M 4/46*   (2006.01)
   *H01M 4/62*   (2006.01)
   *H01M 4/66*   (2006.01)
   *H01M 10/0525*   (2010.01)

(52) U.S. Cl.
   CPC ........... *H01M 4/463* (2013.01); *H01M 4/622* (2013.01); *H01M 4/661* (2013.01); *H01M 10/0525* (2013.01); *H01M 2004/021* (2013.01); *H01M 2220/20* (2013.01)

(56) References Cited

U.S. PATENT DOCUMENTS

| | | |
|---|---|---|
| 2020/0136133 A1 | 4/2020 | Umehara |
| 2022/0140308 A1 | 5/2022 | Nishida et al. |
| 2022/0200008 A1 | 6/2022 | Umehara |
| 2022/0246941 A1 | 8/2022 | Umehara |

FOREIGN PATENT DOCUMENTS

| | | |
|---|---|---|
| JP | 2020-072007 A | 5/2020 |
| WO | 2020170543 A1 | 8/2020 |

\* cited by examiner

METHOD FOR MANUFACTURING RECHARGEABLE BATTERY

BACKGROUND

1. Field

The following description relates to a method for manufacturing a rechargeable battery.

2. Description of Related Art

Battery electric vehicles and hybrid electric vehicles are powered by a rechargeable battery such as a non-aqueous rechargeable battery and a nickel-metal hydride battery. A lithium-ion battery, which is an example of a non-aqueous rechargeable battery, includes electrode plates (positive plate and negative plate). Each electrode plate includes an elongated electrode substrate and a mixture layer that is formed by a mixture paste applied to the electrode substrate. The electrode substrate includes an exposed portion where the mixture paste is not applied and the electrode substrate is exposed along the edges of the electrode substrate in the widthwise direction. The exposed portion is used as a current collector for connection with an external terminal. Further, the positive plate or the negative plate includes an insulating layer formed by an insulating paste at the boundary of the mixture layer and the exposed portion (for example, refer to Japanese Laid-Open Patent Publication No. 2020-072007).

A method for manufacturing the electrode plate includes a step of pressing the mixture layer to adjust the thickness of the mixture layer after the mixture paste and the insulating paste are applied to the electrode substrate and dried to form the mixture layer and the insulating layer. The pressing step deforms the mixture layer and a mixture-applied portion of the electrode substrate on which the mixture layer is formed. Thus, the electrode substrate that has undergone the pressing step has a shape in which the edges of the electric substrate are curved in the widthwise direction due to local differences in the elongation amount of the mixture-applied portion in the widthwise direction. Accordingly, after the pressing step, a stretching step is performed to stretch an extension portion of the electrode substrate extending between the mixture layer and the edges of the electrode substrate so as to correct the curves of the edges in the widthwise direction. The extension portion is where the mixture layer is not formed and includes the exposed portion and part of the electrode substrate where the insulating layer is formed. In the stretching step, tension is applied to the extension portion in a longitudinal direction that is orthogonal to the widthwise direction to correct the curves of the electrode substrate in the widthwise direction.

In the stretching step, force is applied to the extension portion of the electrode substrate so as to obtain an elongation amount taking into consideration deformation caused by spring back. In this case, if the extension portion is subject to excessive plastic deformation that corresponds to a non-uniform plastic deformation region of a stress-strain curve, the extension portion will be deformed in the thickness-wise direction of the electrode substrate in addition to the widthwise direction and thereby be undulated in the thickness-wise direction of the electrode substrate. Accordingly, when welding together exposed portions to form an electrode terminal in a subsequent step, it will be difficult to accurately position and stack the exposed portions. This may lower dimensional stability of the electrode terminal and cause breakage and the like in the exposed portion.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for manufacturing a rechargeable battery includes forming, pressing, and stretching. In the forming, a mixture layer and an insulating layer adjacent to the mixture layer are formed on a foil-like electrode substrate that includes an edge extending in a specified direction so that an exposed portion where the electrode substrate is exposed extends between the edge and the insulating layer on the electrode substrate. In the pressing, the mixture layer is pressed. In the stretching, an extension portion, located between the edge and the mixture layer of the electrode substrate, and the insulating layer are stretched in the specified direction after the pressing. The stretching includes applying a stress that is greater than or equal to a yield stress of the electrode substrate or greater than or equal to a 0.2% proof stress of the electrode substrate and less than a tensile strength of the electrode substrate to the extension portion, and applying a stress that is greater than or equal to a yield stress of the insulating layer or greater than or equal to a 0.2% proof stress of the insulating layer to the insulating layer.

In the method, the electrode substrate may include aluminum. The insulating layer may include a resin component and an inorganic component. A mass ratio of the resin component may be 15% or greater of a mass of the insulating layer.

In the method, the mass ratio of the resin component may be 30% or less of the mass of the insulating layer.

In the method, the edge may include two edges extending in the specified direction of the electrode substrate. The forming may include forming the mixture layer on the electrode substrate between the two edges extending in the specified direction and forming the insulating layer between the mixture layer and each of the edges so that the exposed portion where the electrode substrate is exposed may include two exposed portions respectively arranged between the two edges and the insulating layer. The stretching may include applying tension in the specified direction to the electrode substrate in a state in which the exposed portion and the insulating layer are arranged in contact with a roller to stretch the extension portion and the insulating layer in the specified direction. The roller may include a main body and a large-diameter portion arranged at two sides of the main body and having a larger diameter than the main body. The stretching may include arranging the large-diameter portion in contact with the exposed portion and the insulating layer.

In the method, the mixture layer and the insulating layer may be arranged on each of a first surface and a second surface of the electrode substrate that oppose each other. The roller may be one of a plurality of rollers. The rollers may be used in the stretching. At least a first one of the rollers may contact the exposed portion and the insulating layer arranged on the first surface. At least a second one of the rollers that differs from the first one of the rollers may contact the exposed portion and the insulating layer arranged on the second surface.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of the present disclosure will now be described with reference to FIGS. 1 to 12.

Lithium-Ion Battery

Figure 1:
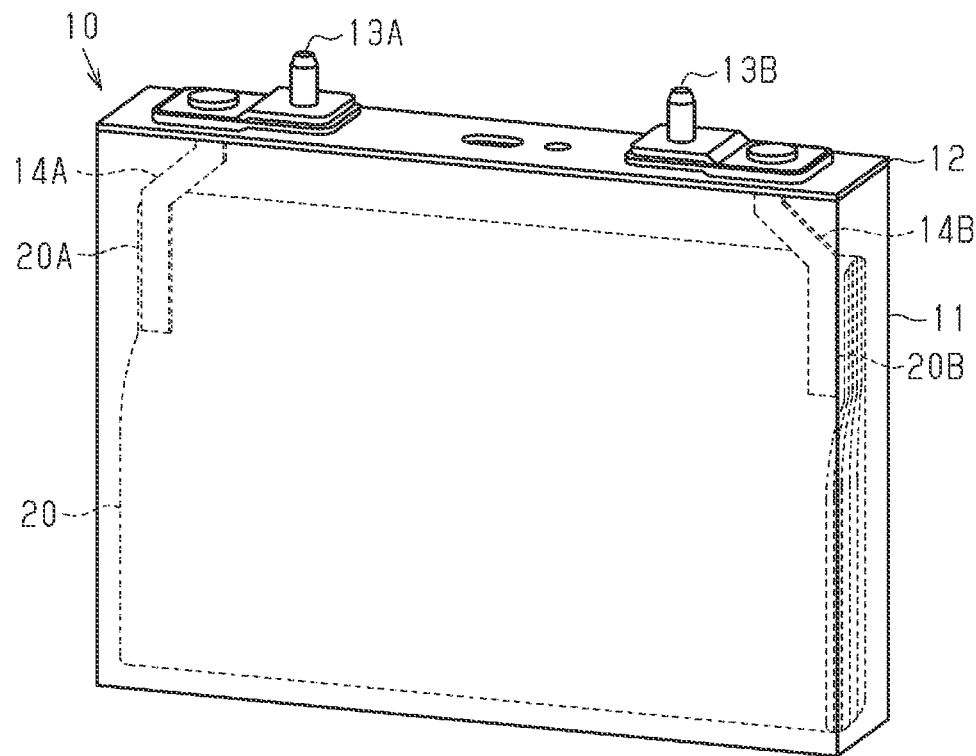
FIG. 1 is a perspective view showing a battery cell of a lithium-ion battery.

As shown in FIG. 1, a lithium-ion battery 10, which is an example of a rechargeable battery, is a battery cell that forms a battery pack when combined with other lithium-ion batteries 10 and encapsulated in a resin or metal case. The battery pack is used in a hybrid electric vehicle or an electric vehicle.

The lithium-ion battery 10 includes a battery case 11 and a cover 12. The battery case 11 is box-shaped and includes an opening in the upper side. The cover 12 closes the opening of the battery case 11. The battery case 11 and the cover 12 are formed from a metal such as aluminum or an aluminum alloy. In the lithium-ion battery 10, the cover 12 is attached to the battery case 11 to form a sealed battery container.

The cover 12 includes two external terminals 13A and 13B. The external terminals 13A and 13B are used for charging and discharging the lithium-ion battery 10. The battery case 11 accommodates an electrode body 20. The electrode body 20 includes a positive current collector 20A at the positive end of the electrode body 20. The positive current collector 20A is electrically connected to the positive external terminal 13A by a positive current collecting member 14A. The electrode body 20 includes a negative current collector 20B at the negative end of the electrode body 20. The negative current collector 20B is electrically connected to the negative external terminal 13B by a negative current collecting member 14B. Further, a nonaqueous electrolyte solution is injected into the battery case 11 through an injection hole (not shown). The shape of the external terminals 13A and 13B is not limited to that shown in FIG. 1 and may be changed.

Electrode Body

Figure 2:
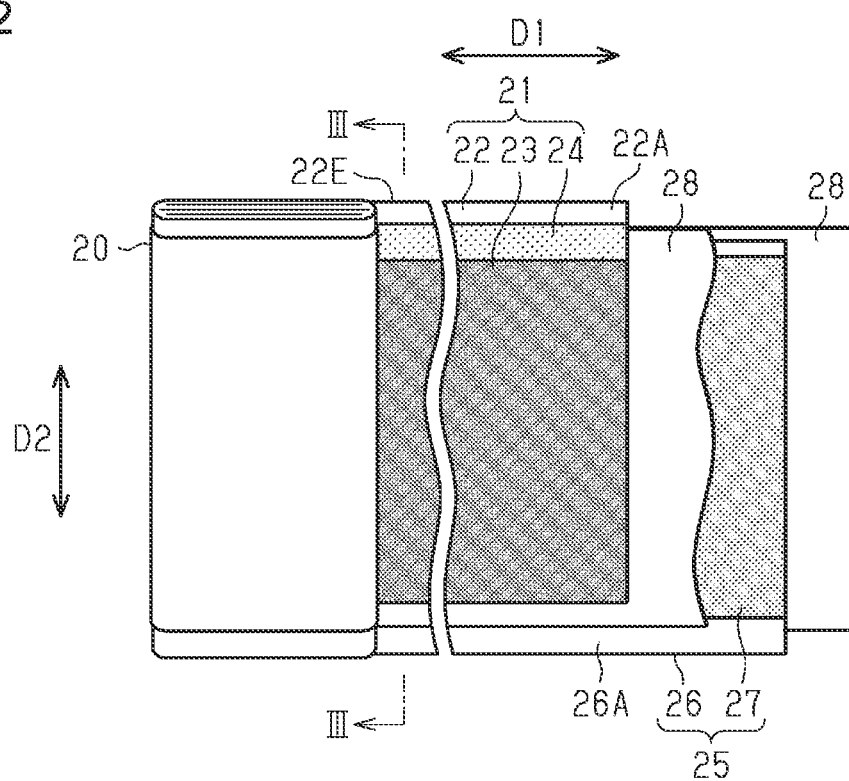
FIG. 2 is a diagram showing an electrode body partially unrolled.
Figure 3:
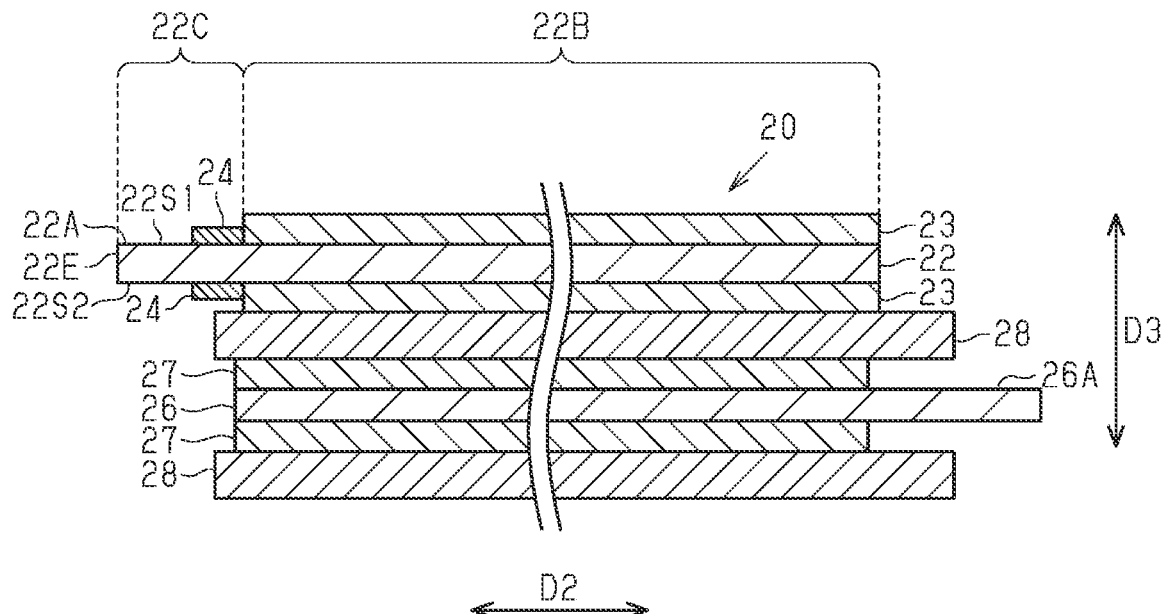
FIG. 3 is a cross-sectional view of the electrode body in an unrolled state.

As shown in FIGS. 2 and 3, the electrode body 20 is a flat rolled body of a laminate in which an elongated positive plate 21 and an elongated negative plate 25 are arranged one onto the other with a separator 28 in between. The positive plate 21 and the negative plate 25 are examples of electrode plates of the electrode body 20. The positive plate 21, the separator 28, the negative plate 25, and the separator 28 are arranged in order in a thickness-wise direction D3 to form an unrolled laminate (refer to FIG. 3). The positive plate 21, the negative plate 25, and the separators 28 are stacked such that the long side is parallel to a longitudinal direction D1.

Positive Plate

As shown in FIG. 2, the positive plate 21 includes a positive electrode substrate 22, a positive electrode mixture layer 23, an insulating layer 24. The positive electrode substrate 22 is a foil-like electrode substrate that has an elongated shape. The positive electrode mixture layer 23 is arranged on each of a first surface 22S1 (refer to FIG. 3) and a second surface 22S2 (refer to FIG. 3) of the positive electrode substrate 22 that oppose each other. The insulating layer 24 is arranged adjacent to the positive electrode mixture layer 23 on each of the first surface 22S1 and the second surface 22S2 of the positive electrode substrate 22.

As shown in FIG. 3, the positive electrode substrate 22 includes an edge 22E extending in a specified direction. An example of the specified direction is the longitudinal direction D1. The edge 22E is an end of the short side of the positive electrode substrate 22 in a widthwise direction D2. The widthwise direction D2 intersects the longitudinal direction D1. In an example, the widthwise direction D2 is orthogonal to the longitudinal direction D1.

The positive electrode substrate 22 includes an exposed portion 22A where the positive electrode mixture layer 23 and the insulating layer 24 are not formed and the positive electrode substrate 22 is exposed to the outside. The exposed portion is arranged between the edge 22E and the insulating layer 24. The insulating layer 24 is arranged at a position separated from the edge 22E of the positive electrode substrate 22 in the positive plate 21. The positive electrode mixture layer 23 is in contact with the insulating layer 24 at the boundary.

The positive electrode substrate 22 includes a mixture-applied portion 22B and an extension portion 22C. The mixture-applied portion 22B is part of the positive electrode substrate 22 on which the positive electrode mixture layer 23 is formed. The extension portion 22C is part of the positive electrode substrate 22 where the positive electrode mixture layer 23 is not formed. In other words, the extension portion 22C is defined by the exposed portion 22A and the part of the positive electrode substrate 22 where the insulating layer 24 is formed.

The positive electrode substrate 22 includes a metal foil formed from aluminum or an alloy having aluminum as a main component. The positive electrode substrate 22 has a thickness of, for example, 8 μm or greater and 18 μm or less. The positive electrode substrate 22 acts as a current collector of the positive electrode. In a rolled body state, the opposing surfaces of the exposed portion 22A of the positive electrode substrate 22 are pressed against one another to form the positive current collector 20A.

The positive electrode mixture layer 23 is a hardened body of a liquified positive electrode mixture paste. The positive electrode mixture layer 23 has a thickness of, for example, 15 μm or greater and 250 μm or less. The positive electrode paste is an example of a mixture paste that includes a positive electrode active material, a positive electrode solvent, a positive electrode conductive material, and a positive electrode binder.

The positive electrode active material includes a lithium-containing composite metal oxide that is capable of absorbing and releasing lithium ions. The lithium-containing composite oxide is an oxide including lithium and another metal element other than lithium. Another metal element other than lithium is, for example, at least one selected from a group consisting of nickel, cobalt, manganese, vanadium, magnesium, molybdenum, niobium, titanium, tungsten, aluminum, and iron contained in a lithium-containing composite oxide as iron phosphate.

The lithium-containing composite oxide is, for example, lithium cobalt oxide ($LiCoO_2$), lithium nickel oxide ($LiNiO_2$), or lithium manganese oxide ($LiMn_2O_4$). The lithium-containing composite oxide is, for example, a ternary lithium-containing composite oxide including nickel, cobalt, and manganese, that is, lithium nickel manganese cobalt oxide ($LiNiCoMnO_2$). The lithium-containing composite oxide is, for example, lithium iron phosphate ($LiFePO_4$).

The positive electrode solvent includes an N-methyl-2-pyrrolidone (NMP) solution, which is an example of an organic solvent. Examples of the positive electrode conductive material include carbon black such as acetylene black and Ketjenblack™, carbon fibers such as carbon nanotubes and carbon nanofibers, or graphite. The positive electrode binder is an example of a resin component included in the positive electrode paste. The positive electrode binder includes, for example, polyvinylidene fluoride (PVDF), polyvinyl alcohol (PVA), or the like.

The insulating layer 24 is a hardened body of a liquified insulating paste. The insulating layer 24 has a smaller thickness than the positive electrode mixture layer 23. The insulating layer 24 has a thickness of, for example, 2 μm or greater and 40 μm or less. The insulating paste includes an inorganic component, an insulating paste solvent, and a resin component. The inorganic component is at least one selected from a group consisting of powder boehmite, titania, and alumina, which are insulative inorganic substances. The insulating paste solvent includes an NMP solution, which is an example of an organic solvent. The resin component acts as a binder in the insulating layer 24. The resin component is at least one selected from a group consisting of PVDF, PVA, and acrylic, which are polymer materials soluble in NMP.

Negative Plate

As shown in FIGS. 2 and 3, the negative plate 25 includes a negative electrode substrate 26 and a negative electrode mixture layer 27. The negative electrode substrate 26 is a foil-like electrode substrate that has an elongated shape. The negative electrode mixture layer 27 is formed on the two surfaces of the negative electrode substrate 26. The negative plate 25 is prepared by kneading the materials of the negative electrode mixture layer 27 and drying the kneaded material applied to the negative electrode substrate 26.

The negative electrode substrate 26 acts as a current collector of the negative electrode. The negative electrode substrate 26 includes a thin film of copper or an alloy having copper as a main component. The negative electrode substrate 26 includes an exposed portion 26A where the negative electrode mixture layer 27 is not formed and the negative electrode substrate 26 is exposed to the outside. The exposed portion 26A is arranged at one end of the negative electrode substrate 26 in the widthwise direction D2 that is opposite to the exposed portion 22A of the positive plate 21. In a rolled body state, the opposing surfaces of the exposed portion 26A are pressed against one another to form the negative current collector 20B.

The negative electrode mixture layer 27 is a hardened body of a liquified negative electrode mixture paste. The negative electrode mixture layer 27 includes a negative electrode active material capable of absorbing and releasing lithium ions. Examples of the negative electrode active material include a carbon material such as graphite, non-graphitizable carbon, and graphitizable carbon. In addition to the negative electrode active material, the negative electrode mixture includes a conductive agent, a binder, and the like.

Separator

The separator 28 avoids contact between the positive plate 21 and the negative plate 25 and holds a nonaqueous electrolyte solution between the positive plate 21 and the negative plate 25. When the electrode body 20 is immersed in the nonaqueous electrolyte solution, the nonaqueous electrolyte permeates the separator 28 from the ends toward the center.

The separator 28 is a nonwoven fabric of polypropylene or the like. The separator 28 may use, for example, an ion conductive polymer electrolyte film, a porous polymer film such as a porous polyethylene film, a porous polyolefin film, and a porous polyvinyl chloride film, and the like.

Nonaqueous Electrolyte Solution

The nonaqueous electrolyte solution is a composition in which a supporting electrolyte is contained in a nonaqueous solvent. The nonaqueous solvent may use one or more materials selected from a group consisting of propylene carbonate, ethylene carbonate, diethyl carbonate, dimethyl carbonate, ethyl methyl carbonate, and the like. Further, the supporting electrolyte may use one or more lithium compounds (lithium salts) selected from $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, LiI, and the like.

In the present embodiment, the nonaqueous solvent includes ethylene carbonate. An additive of lithium bis (oxalate) borate (LiBOB) is added to the nonaqueous electrolyte solution as a lithium salt. For example, LiBOB is added to the nonaqueous electrolyte solution so that the concentration of LiBOB in the nonaqueous electrolyte solution is 0.001 or greater and 0.1 or less (mol/L).

Positive Plate Manufacturing Process

A manufacturing process of the positive plate 21 will now be described with reference to FIGS. 4 to 12.

Figure 4:
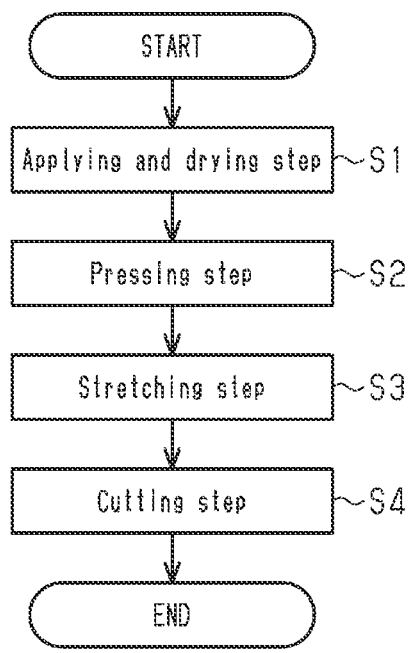
FIG. 4 is a flowchart illustrating the manufacturing procedures of a positive plate.

As shown in FIG. 4, the manufacturing process of the positive plate 21 includes steps S1 to S4.

Applying Step and Drying Step

Step S1 corresponds to a step of applying the positive electrode mixture paste and the insulating paste to the positive electrode substrate 22 and a step of drying the positive electrode mixture paste and the insulating paste to form the positive electrode mixture layer 23 and the insulating layer 24. In step S1, one strip of the positive electrode mixture paste and two strips of the insulating paste are applied to the first surface 22S1 of the positive electrode substrate 22 and dried. Then, one strip of the positive electrode mixture paste and two strips of the insulating paste are also applied to the second surface 22S2 of the positive electrode substrate 22 and dried. In this manner, the positive electrode mixture layer 23 and the insulating layer 24 are formed on both surfaces of the positive electrode substrate 22. When the positive electrode mixture paste is dried, the positive electrode solvent evaporates so that the positive electrode mixture layer 23 includes the positive electrode active material, the positive electrode conductive material, and the positive electrode binder. When the insulating paste is dried, the insulating paste solvent evaporates so that the insulating layer 24 includes the inorganic component and the resin component.

Figure 5:
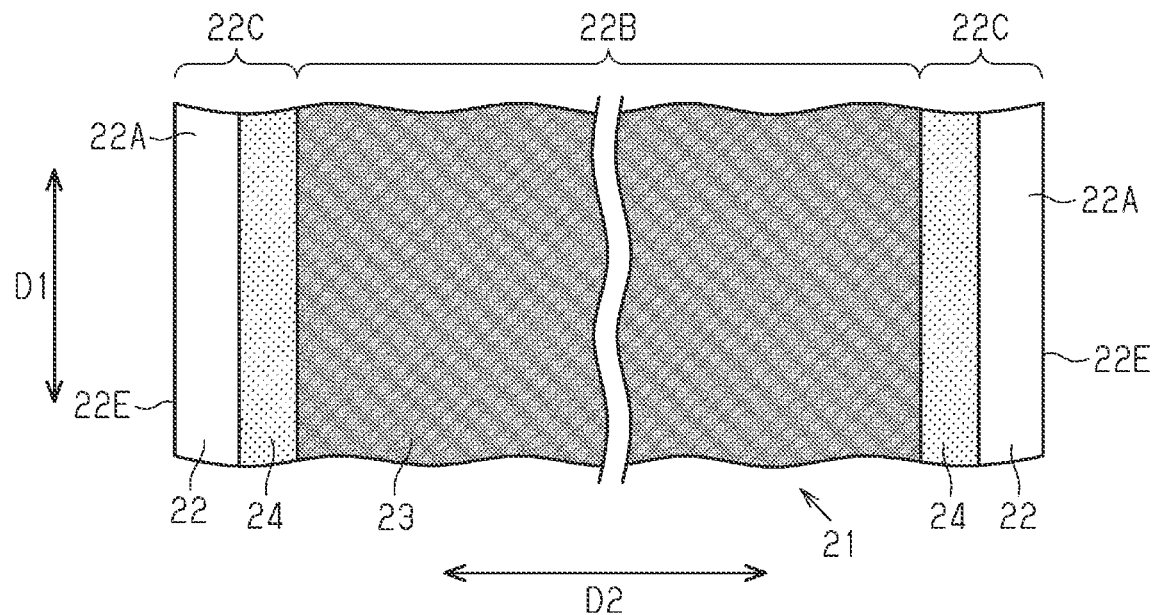
FIG. 5 is a plan view of a positive electrode substrate including a positive electrode mixture layer and an insulating layer.

As shown in FIG. 5, the positive electrode mixture paste is applied to a position separated from the two edges 22E of the positive electrode substrate 22 in the widthwise direction D2 in a central part of the positive electrode substrate 22 in the widthwise direction D2. Each of the two strips of the insulating paste is applied to the positive electrode substrate 22 between the positive electrode mixture paste and the corresponding one of the two edges 22E of the positive electrode substrate 22 and at a position separated from the edge 22E. Further, the two strips of the insulating paste are applied to the positive electrode substrate 22 so that the two strips of the insulating paste sandwich the positive electrode mixture paste and that each of the two strips of the insulating paste is in contact with the positive electrode mixture paste. In this manner, each insulating paste defines one exposed portion 22A where the positive electrode substrate 22 is exposed between the positive electrode mixture paste and the edge 22E in the positive electrode substrate 22. FIG. 5 shows the positive electrode mixture paste and the insulating paste that are dried to form the positive electrode mixture layer 23 and the insulating layer 24.

Pressing Step

Step S2 corresponds to a step of pressing the positive electrode mixture layer 23 formed on the both surfaces (two opposing main surfaces) of the positive electrode substrate 22 to adjust the thickness of the positive electrode mixture layer 23. In step S2, the positive electrode mixture layer 23 is pressed with pressing rollers (not shown) while the positive plate 21 that has undergone the applying step and the drying step is being transferred in a transfer direction D4 (refer to FIG. 6) that is parallel to the longitudinal direction D1. In step S2, the pressing is performed on the positive electrode mixture layer 23 and the mixture-applied portion 22B of the positive electrode substrate 22 on which the positive electrode mixture layer 23 is applied. In step S2, the pressing is not performed on the insulating layer 24 and the extension portion 22C of the positive electrode substrate 22 where the positive electrode mixture layer 23 is absent.

Figure 6:
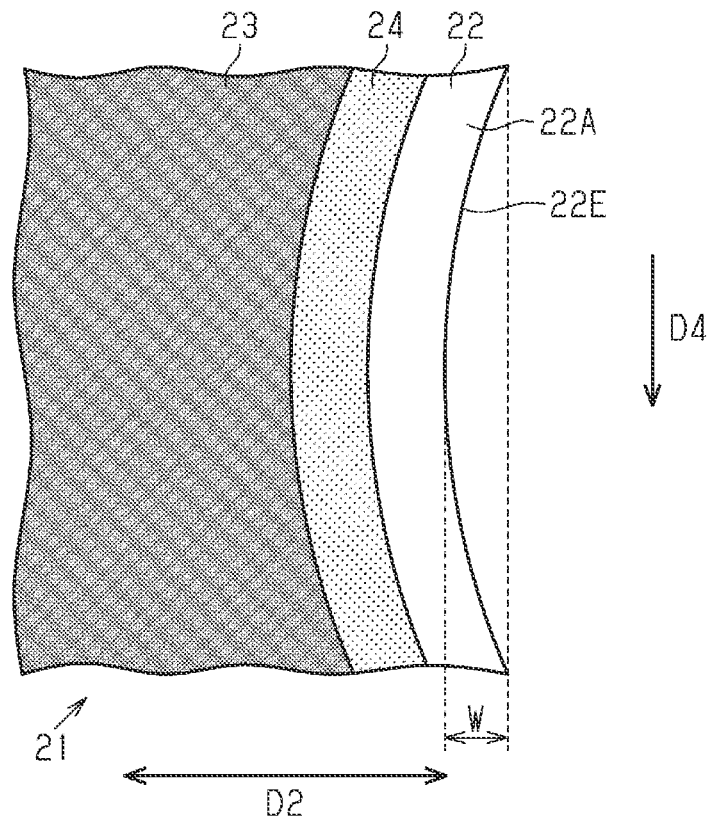
FIG. 6 is an enlarged plan view showing an edge of the positive electrode substrate after a pressing step.

As shown in FIGS. 6, in the positive plate 21 that has undergone the pressing step of step S2, the edge 22E of the positive electrode substrate 22 may be curved in the widthwise direction D2 due to local differences in the elongation amount of the mixture-applied portion 22B of the positive electrode substrate 22. The curved amount W shown in FIG. 6 represents the displacement amount of the edge 22E in the widthwise direction D2. If the positive plate 21 and the negative plate 25 were to be rolled with the edges 22E curved in the widthwise direction D2, the positive plate 21 would have a meandering shape along the curved edges 22E. In this case, it will be difficult for the electrode body 20 to have the desired positive-negative phase difference.

Stretching Step

Figure 7:
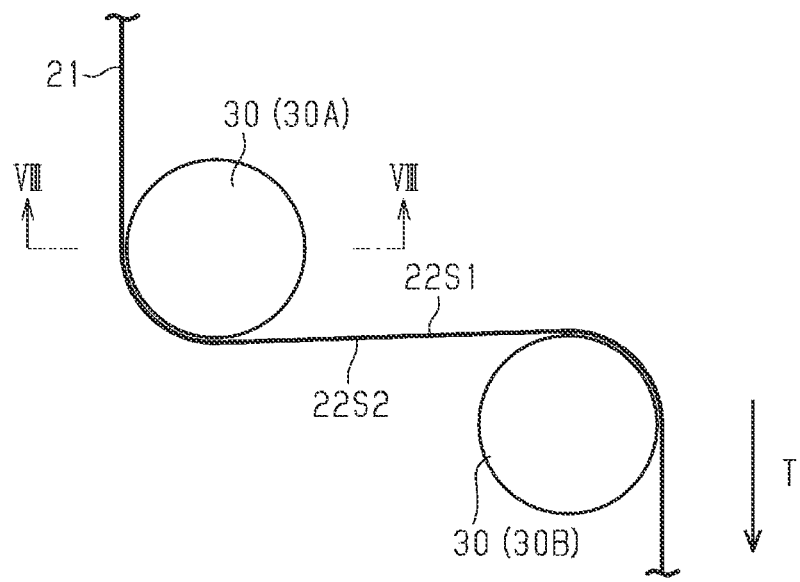
FIG. 7 is a schematic diagram showing the positive plate and rollers in a stretching step.

As shown in FIG. 7, step S3 corresponds to a stretching step performed to correct the curves of the edges 22E in the widthwise direction D2. In the stretching step of step S3, a tension T in the longitudinal direction D1 of the positive plate 21 is applied to the positive electrode substrate 22 that has undergone the pressing step in a state in which one or more rollers 30 are arranged in contact with each of the first surface 22S1 and the second surface 22S2. Hereinafter, a roller 30 that contacts the first surface 22S1 of the positive plate 21 will be referred to as the first roller 30A, and a roller 30 that contacts the second surface 22S2 of the positive plate 21 will be referred to as the second roller 30B. The first roller 30A and the second roller 30B respectively support the first surface 22S1 and the second surface 22S2 of the positive electrode substrate 22.

Figure 8:
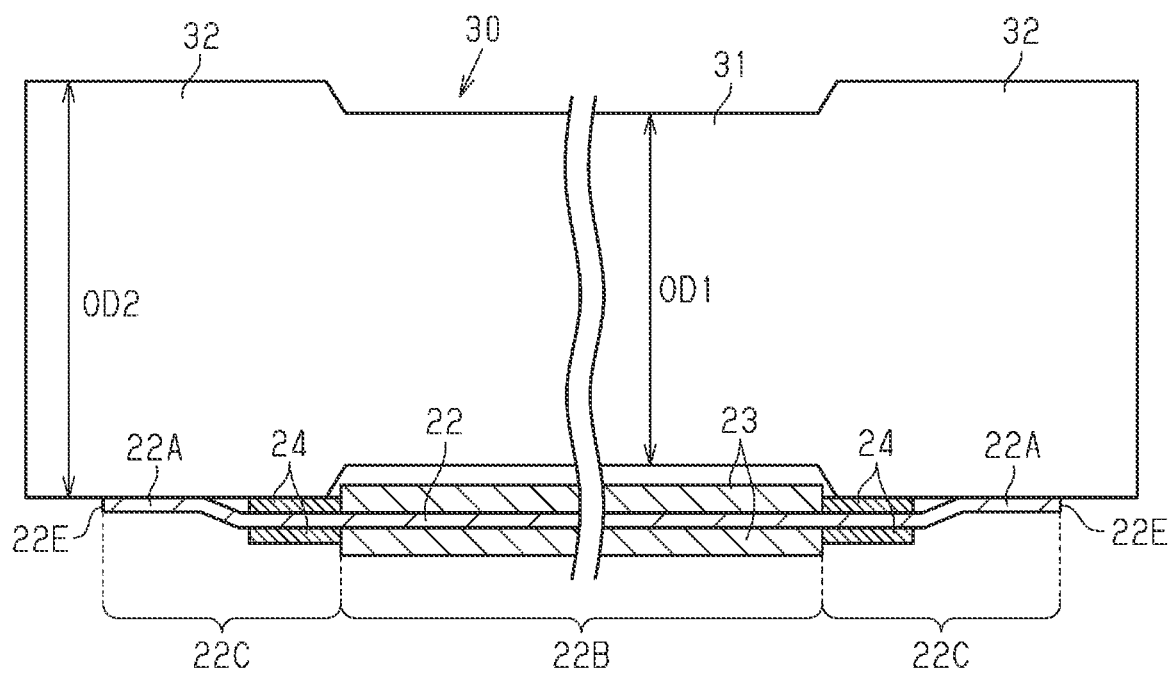
FIG. 8 is a cross-sectional view of the positive plate and the rollers in the stretching step.

As shown in FIG. 8, the roller 30 includes a main body 31 and a large-diameter portion 32 arranged at two sides of the main body 31. In other words, two large-diameter portions 32 are respectively connected to the two ends of the main body 31 in the axial direction of the roller 30. The main body 31 has a first diameter OD1. The large-diameter portion 32 has a second diameter OD2 that is larger than the first diameter OD1. The main body 31 is positioned opposing the positive electrode mixture layer 23 and spaced apart from the positive electrode mixture layer 23.

The large-diameter portion 32 is a part having a larger diameter than the main body 31 in the roller 30. The large-diameter portion 32 contacts the exposed portion 22A and the insulating layer 24. The large-diameter portion 32 of the first roller 30A contact the exposed portion 22A and the insulating layer 24 formed on the first surface 22S1. Also, the large-diameter portion 32 of the second roller 30B contact the exposed portion 22A and the insulating layer 24 formed on the second surface 22S2. Each exposed portion 22A is arranged in contact with the large-diameter portion 32 in a state slightly deformed by an amount corresponding to the thickness of the insulating layer 24.

In the stretching step, the tension T in the longitudinal direction D1 is applied to the positive electrode substrate 22 in a state in which the large-diameter portion 32 of the roller 30 is arranged in contact with the exposed portion 22A and the insulating layer 24. In this case, the main body 31 is spaced apart from the positive electrode mixture layer 23 so that the tension T acts on only the extension portion 22C and the insulating layer 24. When the extension portion 22C and the insulating layer 24 are stretched in the longitudinal direction D1, an internal force directed outward in the widthwise direction D2 acts on the part of the edges 22E recessed toward the center of the positive electrode substrate 22 in the widthwise direction D2. This corrects the curves of the edges 22E in the widthwise direction D2, which have resulted from the pressing step.

The stress applied to the extension portion 22C and the insulating layer 24 is dependent on the magnitude of tension T, cross-sectional areas of the extension portion 22C and the insulating layer 24 as viewed in a cross section of the positive plate 21 taken in the widthwise direction D2, and stress-strain curves of the extension portion 22C and the insulating layer 24. Further, in the stretching step, the insulating layer 24 and the part of the extension portion 22C where the insulating layer 24 is formed have the same deformation amount since these parts abut each other.

Stress-Strain Curve of Insulating Layer

The relationship between a resin component content rate of the insulating layer 24 and the stress-strain curve of the insulating layer 24 will now be described with reference to FIG. 9.

Figure 9:
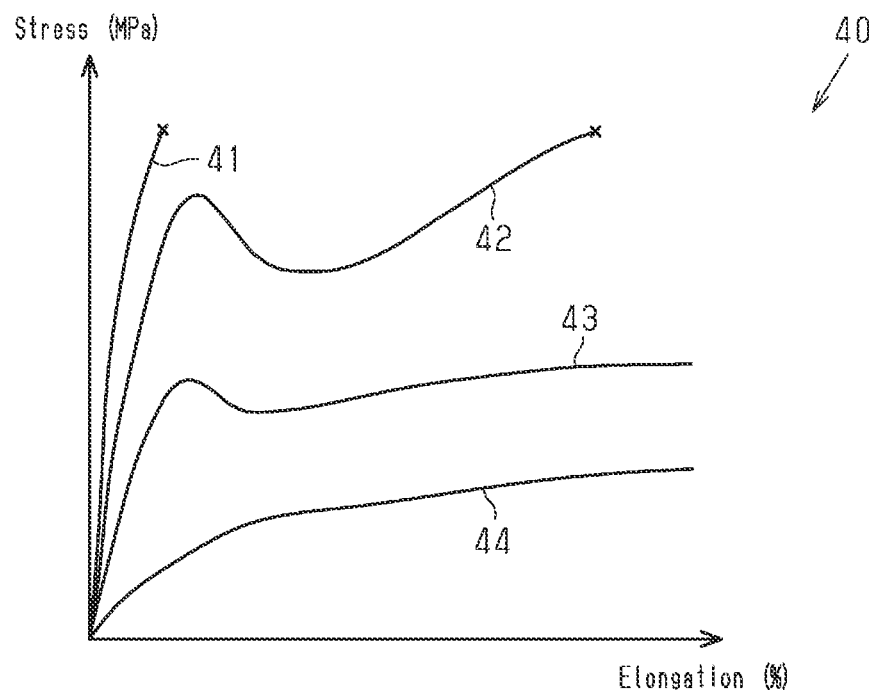
FIG. 9 is a diagram showing stress-strain curves of the insulating layer for various resin component content rates.

In graph 40 of FIG. 9, the vertical axis indicates stress (MPa) acting on the insulating layer 24, and the horizontal axis indicates elongation (strain) (%) of the insulating layer 24. Curves 41 to 44 shown in graph 40 represent the stress-strain curves of the insulating layer 24 for four different resin component content rates. Curve 41, curve 42, curve 43, and curve 44 respectively correspond to the four levels of the resin component content rate in an ascending order.

As the resin component content rate becomes smaller, the insulating layer 24 becomes harder and more brittle. As shown by curve 41, when the resin component content rate of the insulating layer 24 is very small, the insulating layer 24 breaks with hardly any plastic deformation. Further, as shown by curves 42 and 43, when the resin component content rate is higher than that of curve 41, the insulating layer 24 is further elongated before breaking and a yield point appears. As shown by curve 44, when the resin component content rate is higher than that of curve 43, the insulating layer 24 is even further elongated before breaking and the yield point disappears. Therefore, the elongation characteristics of the insulating layer 24 relative to the stress can be controlled by changing the resin component content rate of the insulating layer 24.

Relationship Between Stress-Strain Curve of Positive Electrode Mixture and Stress-Strain Curve of Insulating Layer The relationship between the stress-strain curve of the positive electrode substrate 22 and the stress-strain curve of the insulating layer 24 will now be described with reference to FIG. 10.

Figure 10:
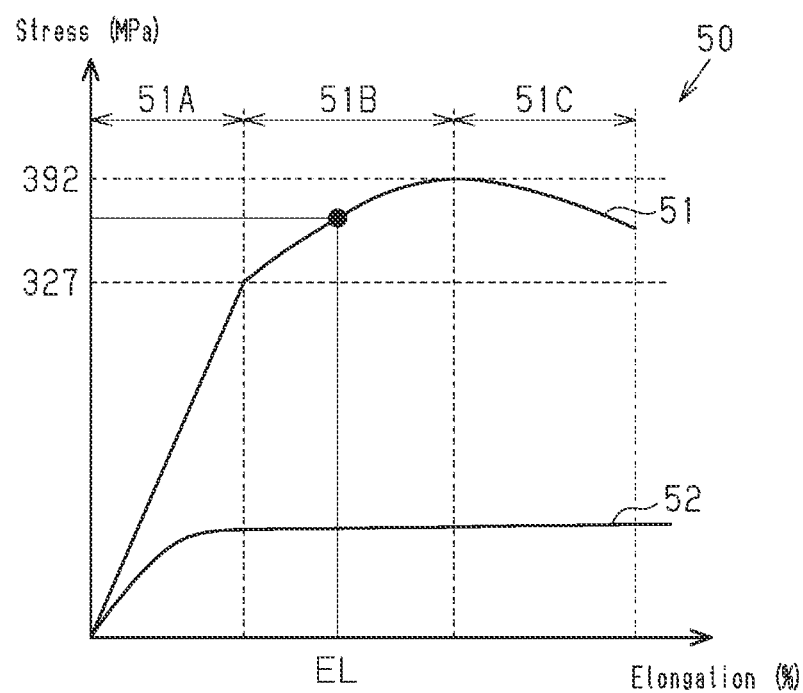
FIG. 10 is a diagram showing a stress-strain curve of the positive electrode substrate and the stress-strain curve of the insulating layer.

In graph 50 of FIG. 10, the vertical axis indicates stress (MPa) acting on the positive electrode substrate 22 and the insulating layer 24, and the horizontal axis indicates elongation (strain) (%) of the positive electrode substrate 22 and the insulating layer 24. Curve 51 shown in graph 50 is an example of the stress-strain curve of the positive electrode substrate 22 when the material forming the positive electrode substrate 22 is aluminum. Curve 52 shown in graph 50 is an example of the stress-strain curve of the insulating layer 24.

In graph 50, the stress-strain curve of the positive electrode substrate 22 can be classified into three regions in accordance with the deformation behavior, namely, elastic deformation region 51A, uniform plastic deformation region 51B, and non-uniform plastic deformation region 51C. In the elastic deformation region 51A, elastic deformation occurs in the positive electrode substrate 22. In the uniform plastic deformation region 51B, uniform plastic deformation occurs in the positive electrode substrate 22. In the non-uniform plastic deformation region 51C, local non-uniform plastic deformation occurs in the positive electrode substrate 22.

In the case of aluminum, the stress at the boundary of the elastic deformation region 51A and the uniform plastic deformation region 51B corresponds to the 0.2% proof stress with which 0.2% of permanent deformation remains after unloading the stress. The 0.2% proof stress of aluminum is, for example, 327 MPa. The stress at the boundary of the uniform plastic deformation region 51B and the non-uniform plastic deformation region 51C corresponds to the maximum stress value, or the tensile strength. The tensile strength of aluminum is, for example, 392 MPa. When a metal material of which the stress-strain curve has an apparent yield point (for example, metal including large amount of interstitial element) is used as the material of the positive electrode substrate 22, the yield point corresponds to the stress at the boundary of the elastic deformation region 51A and the uniform plastic deformation region 51B.

In the stretching step, a force is applied to the extension portion 22C of the positive electrode substrate 22 so as to obtain elongation EL so that a stress that is greater than or equal to the 0.2% proof stress of the positive electrode substrate 22 and less than the tensile strength of the positive electrode substrate 22 acts on the extension portion 22C of the positive electrode substrate 22. At the same time, a stress that is greater than or equal to the yield stress of the insulating layer 24 or greater than or equal to the 0.2% proof stress of the insulating layer 24 is applied to the insulating layer 24. Further, a force is applied to the insulating layer 24 so as to obtain elongation EL in the same manner as the extension portion 22C. Accordingly, the resin component content rate of the insulating layer 24 is determined such that when a force is applied to the extension portion 22C and the insulating layer 24 so as to obtain elongation EL, a stress that is greater than or equal to the yield stress of the insulating layer 24 or greater than or equal to the 0.2% proof stress of the insulating layer 24 acts on the insulating layer 24.

When the material of the positive electrode substrate 22 is aluminum, the resin component mass ratio of the insulating layer 24 may be, for example, greater than or equal to 15% and less than or equal to 30% of the mass of the insulating layer 24. If the resin component mass ratio of the insulating layer 24 is 15% or greater, when a force is applied to the extension portion 22C and the insulating layer 24 so as to obtain elongation EL, a stress that is greater than or equal to the yield stress of the insulating layer 24 or greater than or equal to the 0.2% proof stress of the insulating layer 24 acts on the insulating layer 24. Further, if the resin component mass ratio of the insulating layer 24 is 30% or less, the insulating layer 24 avoids an excessive decrease in the mechanical strength.

Deformation of Exposed Portion in Thickness-Wise Direction

A reference example will now be described with reference to FIG. 11 to illustrate the advantages of the present embodiment. Specifically, the reference example shows the shape of the extension portion 22C when a stress that corresponds to the tensile strength of the positive electrode substrate 22 acts on the extension portion 22C of the positive electrode substrate 22 in the stretching step. The insulating layer 24 is omitted in FIG. 11 to facilitate understanding.

Figure 11:
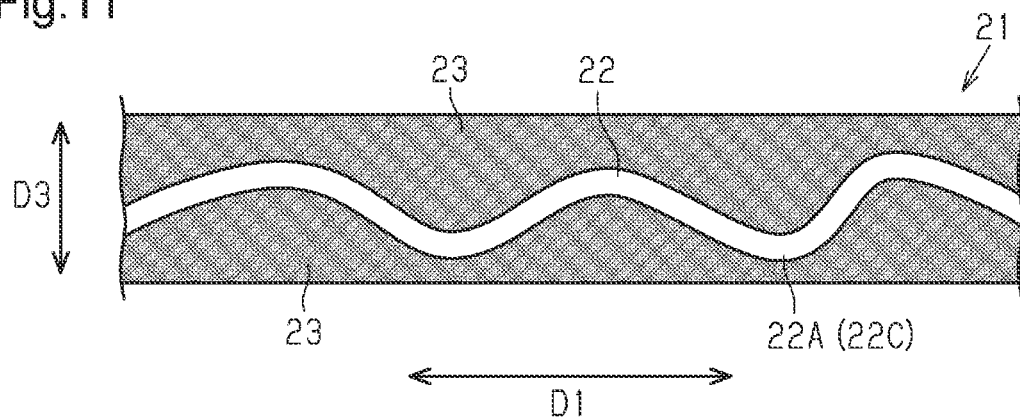
FIG. 11 is a diagram showing the shape of an extension portion of the positive electrode substrate in a reference example in which a stress that corresponds to a tensile strength of the positive electrode substrate is applied to the extension portion in the stretching step.

As shown in FIG. 11, when a stress that corresponds to the tensile strength of the positive electrode substrate 22 acts on the extension portion 22C in the stretching step, the extension portion 22C is subject to non-uniform plastic deformation that occurs in the non-uniform plastic deformation region 51C of the stress-strain curve. In the non-uniform plastic deformation region 51C, local excessive deformation easily occurs in the positive electrode substrate 22. When the extension portion 22C is subject to excessive plastic deformation in the stretching step, the extension portion 22C is deformed in the thickness-wise direction D3 of the positive electrode substrate 22 in addition to the longitudinal direction D1 and the widthwise direction D2. In this case, the extension portion 22C including the exposed portion 22A is undulated in the thickness-wise direction D3.

When the extension portion 22C is significantly deformed in the thickness-wise direction D3, it becomes difficult to accurately position and stack the exposed portions 22A for welding to form the positive current collector 20A in a subsequent step. This may lower dimensional stability of the positive current collector 20A and cause breakage, deformation, and the like in the exposed portion 22A when forming the positive current collector 20A.

The shape of the extension portion 22C in the present embodiment will now be described with reference to FIG. 12. Specifically, a stress that is greater than or equal to the 0.2% proof stress of the positive electrode substrate 22 and less than the tensile strength of the positive electrode substrate 22 acts on the extension portion 22C in the stretching step.

Figure 12:
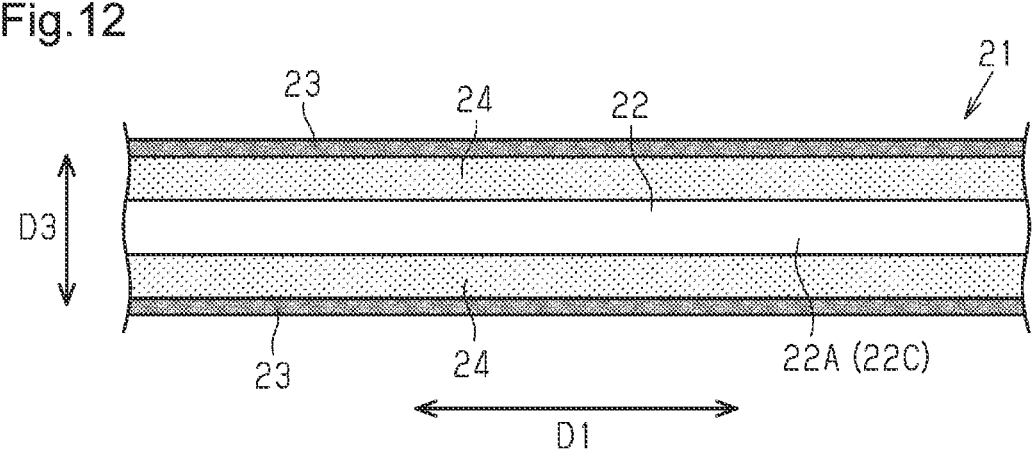
FIG. 12 is a diagram showing the shape of the extension portion of the positive electrode substrate in the present embodiment when a stress that is greater than or equal to a 0.2% proof stress of the positive electrode substrate and less than the tensile strength of the positive electrode substrate is applied to the extension portion in the stretching step.

As shown in FIG. 12, when a stress that is greater than or equal to the 0.2 proof stress of the positive electrode substrate 22 and less than the tensile strength of the positive electrode substrate 22 acts on the extension portion 22C in the stretching step, the extension portion 22C is subject to uniform plastic deformation that occurs in the uniform plastic deformation region 51B of the stress-strain curve. Such uniform plastic deformation minimizes undulating deformation of the extension portion 22C in the thickness-wise direction D3, which would occur in the non-uniform plastic deformation region 51C. This improves the dimensional stability of the exposed portion 22A.

Further, in the stretching step, a stress that is greater than or equal to the yield stress of the insulating layer 24 or greater than or equal to the 0.2% proof stress of the insulating layer 24 acts on the insulating layer 24 so that plastic deformation occurs in the insulating layer 24. The plastically deformed insulating layer 24 abuts the extension portion 22C, thereby limiting deformation of the extension portion 22C caused by a spring back following the stretching step. This also improves the dimensional stability of the exposed portion 22A in the extension portion 22C.

Cutting Step

Step S4 corresponds to a step of cutting the positive plate 21 that has undergone the stretching step of step S3 at the center in the widthwise direction D2. The cutting step divides the positive plate 21 into two in the longitudinal direction D1. In this manner, the positive plate 21 is manufactured by steps S1 to S4.

Advantages of Embodiment

The above embodiment has the following advantages.

(1) In the stretching step, when the extension portion 22C and the insulating layer 24 are stretched in the longitudinal direction D1, an internal force directed outward in the widthwise direction D2 acts on the part of the edge 22E recessed toward the center of the positive electrode substrate 22 in the widthwise direction D2. This corrects the curves of the edge 22E in the widthwise direction D2, which have resulted from the pressing step.

(2) In the stretching step, when a stress that is greater than or equal to the yield stress of the positive electrode substrate 22 or greater than or equal to the 0.2% proof stress of the positive electrode substrate 22 and less than the tensile strength of the positive electrode substrate 22 is applied to the extension portion 22C, uniform plastic deformation occurs in the extension portion 22C. This minimizes undulating deformation of the extension portion 22C in the thickness-wise direction D3, which would occur in the non-uniform plastic deformation region 51C. This improves the dimensional stability of the exposed portion 22A.

(3) In the stretching step, when a stress that is greater than or equal to the yield stress of the insulating layer 24 or greater than or equal to the 0.2% proof stress of the insulating layer 24 is applied to the insulating layer 24, plastic deformation occurs in the insulating layer 24. The plastically deformed insulating layer 24 limits deformation of the extension portion 22C caused by a spring back following the stretching step. Thus, the dimensional stability of the exposed portion 22A is improved.

(4) When the positive electrode substrate 22 includes aluminum and if the resin component mass ratio of the insulating layer 24 is 15% or greater, a stress that is greater than or equal to the yield stress of the insulating layer 24 or greater than or equal to the 0.2% proof stress of the insulating layer 24 is applied to the insulating layer 24 in the stretching step. In other words, when a force is applied to the extension portion 22C and the insulating layer 24 so as to obtain a specified elongation EL, a stress that is greater than or equal to the 0.2% proof stress of aluminum and less than the tensile strength of aluminum acts on the extension portion 22C, and a stress that is greater than or equal to the yield stress of the insulating layer 24 or greater than or equal to the 0.2% proof stress of the insulating layer 24 acts on the insulating layer 24.

(5) When the resin component mass ratio of the insulating layer 24 is 30% or less, the insulating layer 24 will avoid excessive decreases in the mechanical strength. This improves the dimensional stability of the exposed portion 22A without reducing a short-circuiting prevention functionality of the insulating layer 24.

(6) In the stretching step, the extension portion 22C and the insulating layer 24 are arranged in contact with the large-diameter portion 32 of the roller 30 so that the tension T selectively acts on the extension portion 22C and the insulating layer 24. In this manner, the stretching step corrects the curves of the positive electrode substrate 22 in the widthwise direction D2, which have resulted from the pressing step.

(7) In the stretching step, the first roller 30A and the second roller 30B respectively support the positive plate 21 from the first surface 22S1 and the second surface 22S2 of the positive electrode substrate 22. This also minimizes deformation of the extension portion 22C and the insulating layer 24 in the thickness-wise direction D3 and, in turn, improving the dimensional stability of the exposed portion 22A.

EXAMPLES

Example 1 and comparative examples 1 and 2 of the positive plate 21 will now be described. The examples are not intended to limit the above-described embodiment.

Example 1

In example 1, the positive electrode substrate 22 was formed from aluminum and had a thickness of 12 μm. Then, one strip of the positive electrode mixture layer 23 and two strips of the insulating layer 24 were formed on each of the first surface 22S1 and the second surface 22S2 of the positive electrode substrate 22. The insulating layer 24 included the inorganic component of boehmite and the resin component of PVDF, which is an example of a binder. In the insulating layer 24, the mass ratio of the inorganic component and the resin component satisfied the following equation, "inorganic component:resin component=80%:20%". The insulating layer 24 had a thickness of 10 μm.

Figure 13:
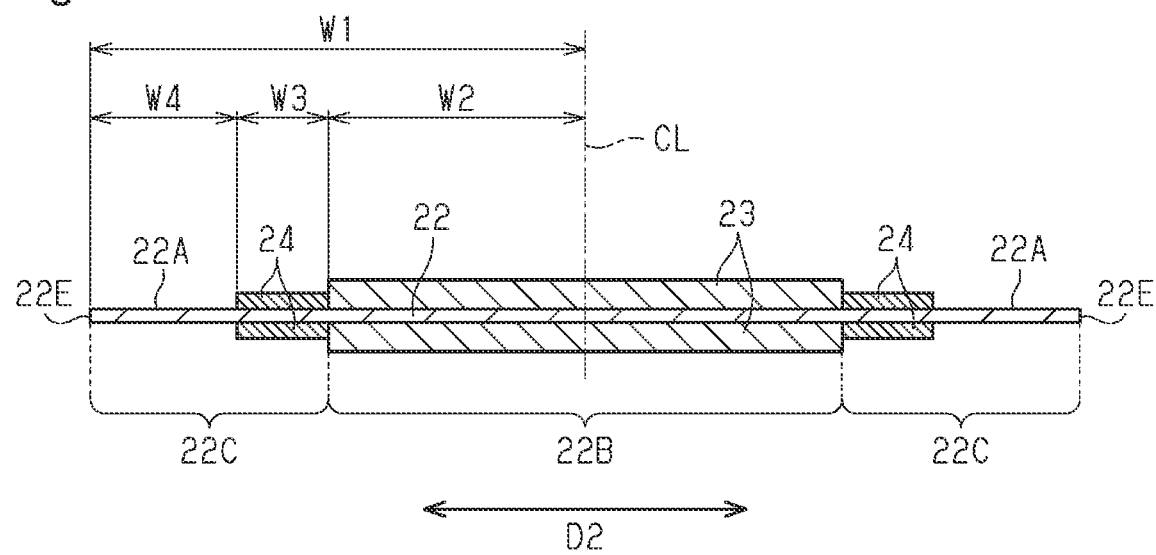
FIG. 13 is a cross-sectional view of the positive plate in example 1.

As shown in FIG. 13, in example 1, width W1 of the positive electrode substrate 22 from the center line CL indicated by the single-dashed line to the edge 22E in the widthwise direction D2 was set to 103.5 mm Width W2 of the positive electrode mixture layer 23 from the center line CL to the end of the positive electrode mixture layer 23 in the widthwise direction D2 was set to 89.6 mm Width W3 of the insulating layer 24 in the widthwise direction D2 was set to 4.1 mm Width W4 of the exposed portion 22A in the widthwise direction D2 was set to 9.8 mm. The applying step and the drying step were performed to manufacture a positive plate 21 having above-described component and dimension. Then, the pressing step, the stretching step, and the cutting step were performed on the positive plate 21.

In the stretching step, the tension T was set to 100N so that a stress that corresponds to the 0.2% proof stress of aluminum was applied to the extension portion 22C. The 0.2% proof stress of the aluminum used in example 1 and comparative examples 1 and 2 was 327 MPa. In this case, a stress that is greater than or equal to the 0.2% proof stress of the insulating layer 24 or greater than or equal to the yield stress of the insulating layer 24 was applied to the insulating layer 24. Accordingly, the insulating layer 24 was plastically deformed.

Comparative Example 1

In comparative example 1, the applying step, the drying step, the pressing step, the stretching step, and the cutting step were performed in the same manner as in example 1 except in that the positive electrode substrate 22 did not include the insulating layer 24.

Comparative Example 2

In comparative example 2, the applying step, the drying step, the pressing step, and the stretching step were performed in the same manner as in comparative example 1 except in that the tension T was set to 120 N so that a stress that corresponds to the tensile strength of aluminum was applied to the extension portion 22C in the stretching step. The tensile strength of the aluminum used in example 1 and comparative examples 1 and 2 was 392 MPa.

Evaluation 1

In evaluation 1, the positive plate 21 in example 1 and comparative examples 1 and 2 were evaluated on whether the curves in the widthwise direction D2 resulted from the pressing step had been corrected at a stage where the stretching step was completed. In evaluation 1, a circle indicating "good" is marked when the curves in the widthwise direction D2 were corrected and an "x" indicating "poor" is marked when the curves in the widthwise direction D2 were not corrected.

Evaluation 2

In evaluation 2, the positive plate 21 in example 1 and comparative examples 1 and 2 were evaluated on whether undulation in the thickness-wise direction D3 had resulted from the stretching step at a stage in which the stretching step was completed. In evaluation 2, a circle indicating "good" is marked when no undulation in the thickness-wise direction D3 occurred and an "x" indicating "poor" is marked when some undulation in the thickness-wise direction D3 occurred.

TABLE 1

| Sample | Insulating Layer | Stress (MPa) | Curve in Widthwise Direction | Undulation in Thickness-Wise Direction |
|---|---|---|---|---|
| Example 1 | Included | 327.0 | ○ | ○ |
| Comparative Example 1 | Not Included | 327.0 | x | ○ |
| Comparative Example 2 | Not Included | 392.4 | ○ | x |

As Table 1 indicates, the curves in the widthwise direction D2 were corrected in example 1 and comparative example 2. However, the curves partially remained in comparative example 1. Since comparative example 1 did not include the insulating layer 24, it can be understood that the spring back following the stretching step reduced the deformation amount of the extension portion 22C in the widthwise direction D2. Although comparative example 2 did not include the insulating layer 24, the extension portion 22C was deformed to an extent that caused non-uniform plastic deformation. Accordingly, it can be understood that even with the spring back following the stretching step, the extension portion 22C obtained the deformation amount in the widthwise direction D2.

In example 1 and comparative example 1, the extension portion 22C included no undulation in the thickness-wise direction D3. In comparative example 2, the extension portion 22C included some undulation in the thickness-wise direction D3. In comparative example 2, the extension portion 22C was deformed to an extent that caused non-uniform plastic deformation. Accordingly, it can be understood that local excessive plastic deformation occurred in the extension portion 22C and undulated the extension portion 22C in the thickness-wise direction D3.

Modified Examples

The above embodiment may be modified as described below.

In the stretching step, the number of the rollers 30 may be one, three, or more. For example, either one of the first roller 30A or the second roller 30B may be used. Alternatively, another roller 30 may be used in addition to the first roller 30A and the second roller 30B.

In the stretching step, as long as the tension T selectively acts on the extension portion 22C and the insulating layer 24, the roller 30 including the main body 31 and the large-diameter portion 32 does not have to be used. For example, two cylindrical pressing rollers may be arranged in contact with the extension portion 22C and the insulating layer 24 on the two sides of the positive plate 21 in the widthwise direction D2, respectively.

In the stretching step, there is no limitation to the resin component mass ratio of the insulating layer 24 as long as a stress that is greater than or equal to the yield stress of the insulating layer 24 or greater than or equal to the 0.2% proof stress of the insulating layer 24 acts on the insulating layer 24. For example, the insulating layer 24 may have the resin component mass ratio that is greater than 30% as long as the mechanical strength of the insulating layer 24 is maintained. In this case, the elongation characteristics of the insulating layer 24 relative to the stress will cause plastic deformation of the insulating layer 24 with a lower stress and increase the elongation of the insulating layer 24 before breaking.

In the described example, the positive plate 21 includes the insulating layer 24. Alternatively, the negative plate 25 may include an insulating layer at the boundary of the exposed portion 26A and the negative electrode mixture layer 27. In this case, the negative plate 25 is manufactured in the same manner as the positive plate 21. Specifically, in the stretching step, a stress that is greater than or equal to the 0.2% proof stress of the negative electrode substrate 26 and less than the tensile strength of the negative electrode substrate 26 (for example, copper) is applied to the exposed portion 26A, and a stress that is greater than or equal to the yield stress of the insulating layer or greater than or equal to the 0.2% proof stress of the insulating layer is applied to the insulating layer of the negative plate 25.

The lithium-ion battery 10 is an example of a rechargeable battery. However, the manufacturing method of the above embodiment may be applied to any rechargeable battery that includes an electrode substrate, a mixture layer, an insulating layer, and an exposed portion. Therefore, a rechargeable battery is not limited to a non-aqueous rechargeable battery such as the lithium-ion battery 10 and may be, for example, a nickel-metal hydride battery.

In the above described example, the electrode body 20 is a rolled body of a laminate in which the positive plate 21 and the negative plate 25 are placed one onto the other with the separator 28 in between. However, for example, the laminate may be formed by multiple positive plates 21 and multiple negative plates 25 alternately arranged with the separator 28 located in between.

The lithium-ion battery 10 may be mounted on an automated guided vehicle, a truck, an electric vehicle, a hybrid vehicle, and the like as well as a computer or other electronic devices. Further, the lithium-ion battery 10 may be part of a system other than the above. For example, the lithium-ion battery 10 may be arranged on a mobile body such as a vessel and an aircraft. Furthermore, the lithium-ion battery 10 may be part of a power supplying system that supplies power from a power plant through a power substation and the like to buildings and houses where a rechargeable battery is installed.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for manufacturing a rechargeable battery, comprising:
   forming a mixture layer and an insulating layer adjacent to the mixture layer on a foil-shaped electrode substrate that includes an edge extending in a predetermined direction so that an exposed portion where the electrode substrate is exposed extends between the edge and the insulating layer on the electrode substrate;
   pressing the mixture layer; and
   stretching an extension portion, located between the edge and the mixture layer of the electrode substrate, and the insulating layer in the predetermined direction after the pressing;
   wherein the stretching includes applying:
      a stress that is less than a tensile strength of the electrode substrate and either:
         greater than or equal to a yield stress of the electrode substrate; or
         greater than or equal to a 0.2% proof stress of the electrode substrate to the extension portion, and
      a stress that is either:
         greater than or equal to a yield stress of the insulating layer; or
         greater than or equal to a 0.2% proof stress of the insulating layer to the insulating layer.

2. The method according to claim 1, wherein
   the electrode substrate includes aluminum,
   the insulating layer includes a resin component and an inorganic component, and
   a mass ratio of the resin component is 15% or greater of a mass of the insulating layer.

3. The method according to claim 2, wherein the mass ratio of the resin component is 30% or less of the mass of the insulating layer.

4. The method according to claim 1, wherein:
   the edge includes two edges extending in the predetermined direction of the electrode substrate;
   the forming includes forming the mixture layer on the electrode substrate between the two edges extending in the predetermined direction and forming the insulating layer between the mixture layer and each of the edges so that the exposed portion where the electrode substrate is exposed includes two exposed portions respectively arranged between the two edges and the insulating layer;
   the stretching includes applying tension in the predetermined direction to the electrode substrate in a state in which the exposed portion and the insulating layer are arranged in contact with a roller to stretch the extension portion and the insulating layer in the predetermined direction;
   the roller includes a main body and a large-diameter portion arranged at two sides of the main body and having a larger diameter than the main body; and
   the stretching includes arranging the large-diameter portion in contact with the exposed portion and the insulating layer.

5. The method according to claim 4, wherein
   the mixture layer and the insulating layer are arranged on each of a first surface and a second surface of the electrode substrate that oppose each other,
   the roller is one of a plurality of rollers,
   the rollers are used in the stretching, at least a first one of the rollers contacts the exposed portion and the insulating layer arranged on the first surface, and at least a second one of the rollers that differs from the first one of the rollers contacts the exposed portion and the insulating layer arranged on the second surface.

\* \* \* \* \*